Feb. 6, 1934.     R. S. SANFORD     1,946,036
BRAKE
Original Filed Jan. 18, 1928     2 Sheets-Sheet 1
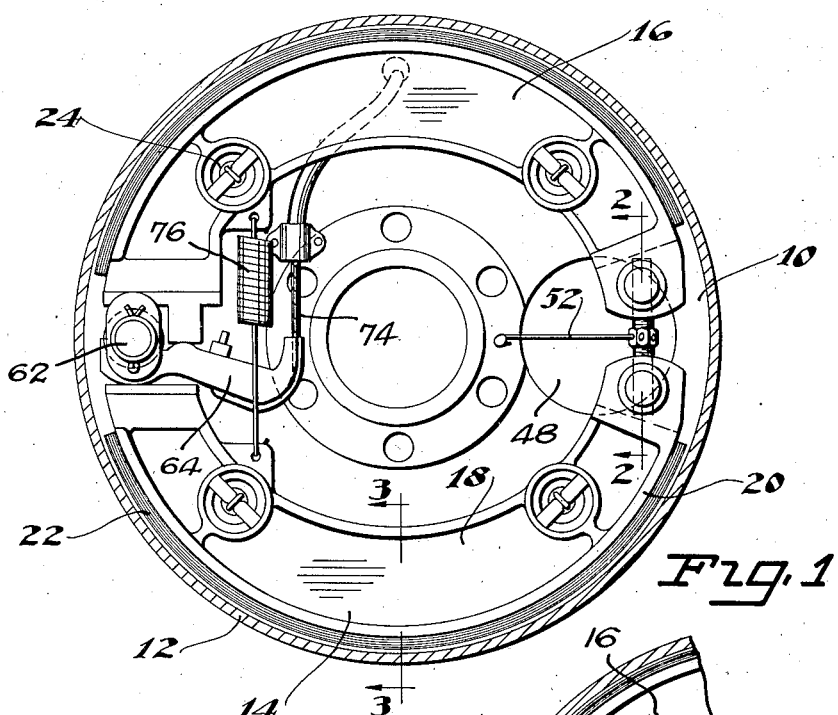
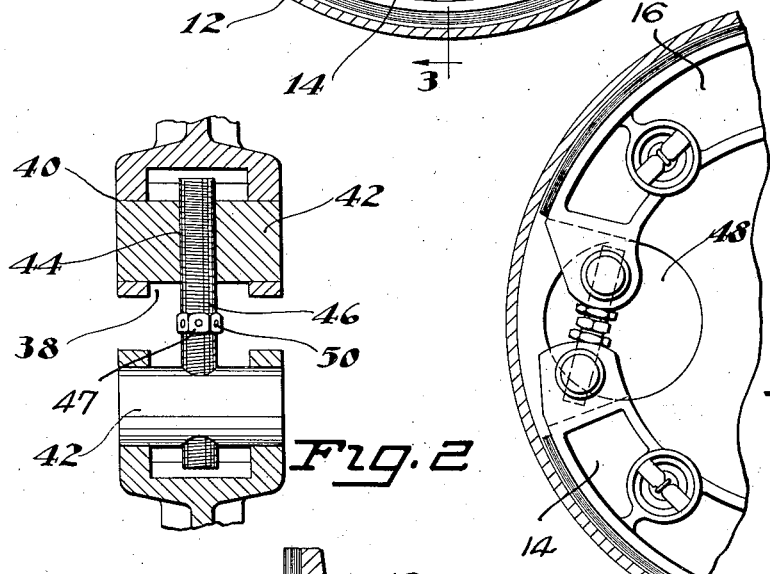
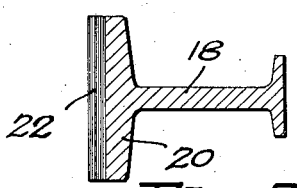
INVENTOR.
ROY S. SANFORD
BY
M. W. McConkey
ATTORNEY Feb. 6, 1934.  R. S. SANFORD  1,946,036
BRAKE
Original Filed Jan. 18, 1928   2 Sheets-Sheet 2
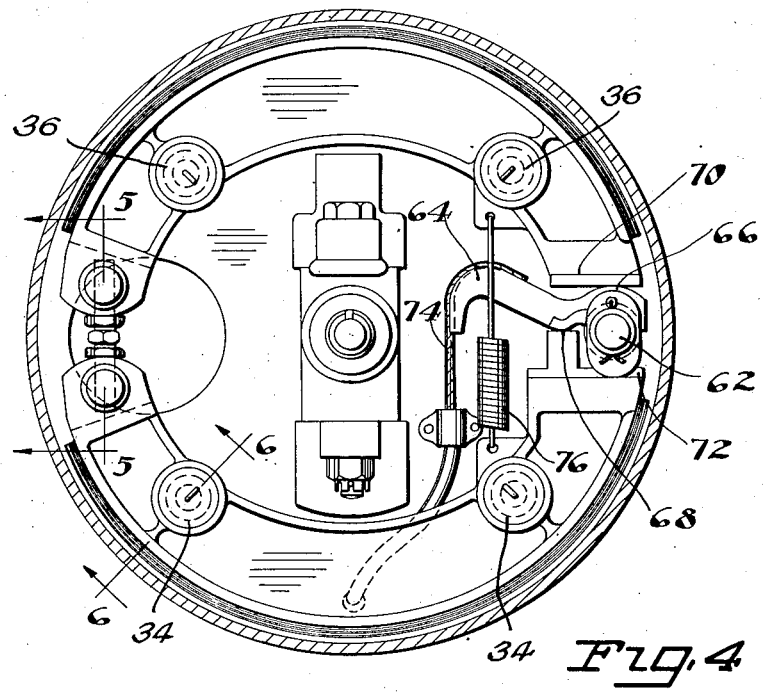
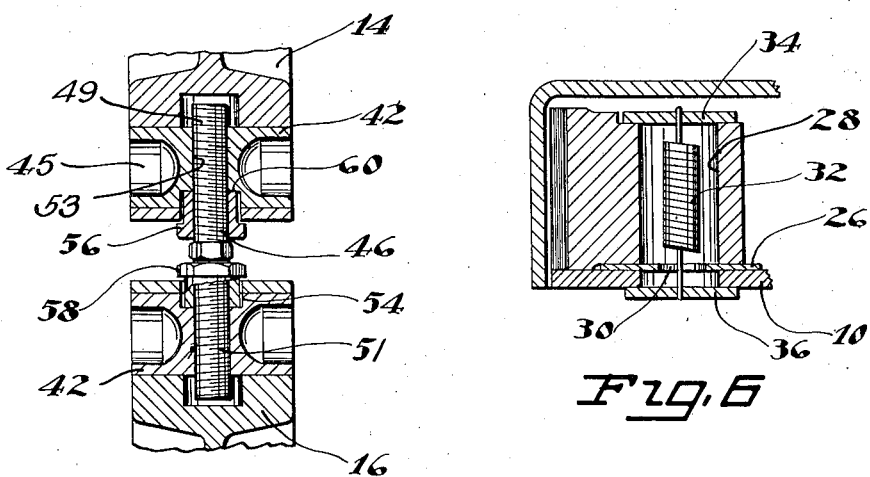
INVENTOR.
ROY S. SANFORD
BY
M. W. McConkey
ATTORNEY Patented Feb. 6, 1934

1,946,036

UNITED STATES PATENT OFFICE 1,946,036

BRAKE

Roy S. Sanford, South Bend, Ind., assignor to Bendix Brake Company, South Bend, Ind., a corporation of Illinois Original application January 18, 1928, Serial No. 247,505. Divided and this application December 3, 1930. Serial No. 499,683

9 Claims. (Cl. 188—79.5)

This invention relates to brakes and more particularly to internal expanding brakes.

The present invention is a division of my pending application Serial No. 247,505, filed January 18, 1928.

The invention broadly comprehends a floating expansible joint to take up for wear of the friction lining, so that the friction elements of the brake may be maintained in proper spaced relation to the braking surface of the drum.

An important object of the invention is to provide a floating expansible joint for the articulated ends of the friction element, so that the articulated ends may be adjusted in proper relation with respect to each other.

Another important object of the invention is to provide an expansible member for connecting the articulated ends of a friction member providing for free movement of the members.

Yet a further object of the invention is to provide an expansible member for the articulated ends of a friction element arranged to provide a quick adjustment between these members and having means for locking the members in adjusted position.

A further object of the invention is to provide a simple and inexpensive means for connecting the articulated ends of the friction elements, so that these elements may be readily adjusted with respect to each other.

Other objects of the invention will appear from the following description taken in connection with the drawings, which form a part of this specification, and in which:

Figure 1 is a vertical sectional view of a brake structure taken just back of the head of the drum illustrating the invention as applied;

Figure 2 is a sectional view substantially on line 2—2, Figure 1;

Figure 3 is a sectional view substantially on line 3—3, Figure 1;

Figure 4 is a view similar to Figure 1 illustrating a modified form of the invention;

Figure 5 is a sectional vew substantally on line 5—5, Figure 4;

Figure 6 is a sectional view substantially on line 6—6, Figure 4; and

Figure 7 illustrates a further modification of the connection between the articulated friction elements of the brake.

Referring to the drawings for more specific details of the invention, 10 represents a fixed support such as a backing plate having associated therewith a rotatable drum 12 which may be secured to a wheel, not shown. Positioned for radial and circumferential movements on the backing plate are interchangeable shoes 14 and 16. Each of these shoes comprises a web 18 and a rim 20 to which is secured a friction lining 22 adaptable for co-operation with the braking surface of the drum.

As shown in Figure 6, a suitable wear plate 26 is positioned on the backing plate 10 and the shoes 14 and 16 are positioned for radial and circumferential movement on the wear plate. As shown, the shoes are transversely bored adjacent their respective ends as indicated at 28. These bores are concentric with openings 30 in the wear plate 26. Coil springs 32 extend through the bores 28 and openings 30 and have their respective ends secured to disks 34 and 36. These springs serve to retain the shoes on the wear plate in any position to which they may be shifted by the whipping action of the drum.

As shown, the articulated ends of the friction elements or shoes are longitudinally slotted as indicated at 38 and provided with transverse bores 40 and cylindrical members 42 are positioned for movement in the bores 40. These cylindrical members have diametral bores 44 threaded to receive a turn screw 46. The screw is provided with right and left hand threads adapted to travel the bores 44 in the cylindrical members 42 and a polygonal portion 47 adaptable for the reception of an adjusting wrench which may be inserted through an opening 48 in the backing plate.

The faces of the polygonal portion of the screw are provided with recesses 50 adaptable for the reception of a wire 52 suitably secured on the backing plate 10. This wire serves to retain the screw 46 in adjusted position, so that the relative position of the shoes 14 and 16 may be maintained.

In Figures 4 and 5, I have shown a modified form of the invention wherein the cylindrical members 42 are formed with hollow end portions 45 which materially reduce weight. In this modification, the cylindrical members have diametral bores 53 terminating in enlarged bores 54. The smaller bores 53 are threaded to receive the respective ends of the screw 46 which has right and left threaded portions 49 and 51 and threaded on the portions 49 and 51 are lock nuts 56 and 58, each having a sleeve 60 adapted to seat in the larger bore of the diametral bores 44 to lock the screw 46 in adjusted position. As shown, the screw 46 is provided with a polygonal portion positioned between the lock nuts 56 and 58 and accessible through an opening in the backing plate, so that ready adjustment of the screw 46 and hence the shoes may be accomplished.

As shown, a fixed anchor 62 is positioned on the backing plate between the separable ends of the friction elements and pivoted on the anchor is an operating lever 64 having cam surfaces 66 and 68 engaging suitable wear plates 70 and 72 secured on the respective separable ends of the friction elements.

The lever has connected thereto an operating cable 74 extending through the backing plate to a suitable source of power, not shown, and connected between the friction elements is a coil spring 76 adapted to return the friction elements to the idle position and to retain them in close engagement with the cam surfaces of the operating lever.

A modification of the invention is illustrated in Figure 7. In this modification, the screw or an equivalent connection is inclined at an acute angle to a tangent to the drum opposite the connection. This serves two purposes. First, it increases the servo or self-energizing effect of the primary shoe and secondly, it increases the outward or applying pressure on the unanchored or left end of the secondary shoe. As the secondary shoe is forced with very great pressure at its anchored end, it ordinarily wears much faster at that end than at its unanchored end. By the above described expedient, the pressure at the unanchored end can be increased sufficiently to equalize the wear.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake comprising a floating friction device having at least two parts, a pivot on each of the parts, and a floating thrust connection between said parts including a screw having right and left threads adaptable for travel in the pivots, and a member associated with the screw and contacting with another portion of the brake for locking the screw against movement.

2. A brake comprising at least two friction elements arranged end to end, the adjacent ends of the friction elements having longitudinal slots and transverse bores, pivots positioned in the respective bores, diametral bores in the pivots, a screw having right and left threads adapted to travel in the diametral bores in the pivots, a polygonal portion on the screw and lock nuts on the screw adapted to lock the screw to the pivots.

3. A brake comprising at least two elements arranged end to end and provided with longitudinal slots and transverse bores, cylindrical members positioned in the bores, the cylindrical members having smaller and longer double diametral bores, the smaller bores in the cylindrical members having threads, a screw having right and left threads adapted to travel in the threads in the smaller of the double diametral bores, lock nuts positioned to travel on the right and left threads of the screw and to seat in the larger of the double diametral bores in the cylindrical members and means on the screw between the lock nuts adaptable for the reception of an adjusting wrench.

4. A brake comprising a drum, a pair of shoes arranged end to end and a floating connection between the shoes inclined at an acute angle to a line tangent to the drum opposite the connection.

5. A brake comprising a drum, a pair of shoes arranged end to end, one of which forces the other against the drum when the brake is applied and a floating connection between the shoes inclined at an acute angle to a line tangent to the drum opposite the connection.

6. A brake comprising a drum, a pair of shoes arranged end to end, one of which forces the other against the drum when the brake is applied and a floating link pivoted at its ends to the shoes inclined at an acute angle to a line tangent to the drum opposite the link.

7. A brake comprising a pair of floating shoes having an adjustable right-and-left threaded member connecting and floating with said shoes, and means engaging said member and another part of the brake and locking said member in adjusted position.

8. A brake comprising a braking plate having mounted thereon a pair of floating shoes having an adjustable right-and-left threaded member connecting and floating with said shoes, and means engaging said member and the backing plate and locking said member in adjusted position.

9. A brake comprising a pair of floating shoes having an adjustable right-and-left threaded member connecting and floating with said shoes, said member having an enlarged operating part midway between the ends of the shoes, and locking means engaging and normally holding said enlarged part.

ROY S. SANFORD.

CERTIFICATE OF CORRECTION.

Patent No. 1,946,036. February 6, 1934.

ROY S. SANFORD.

It is hereby certified that error appears in the printed specification of the above numbered patent requiring correction as follows: Page 2, line 117, claim 8, for "braking" read backing; and that the said Letters Patent should be read with this correction therein that the same may conform to the record of the case in the Patent Office.

Signed and sealed this 5th day of March, A. D. 1935.

Leslie Frazer (Seal) Acting Commissioner of Patents.